W. S. ADAMS.
CAR TRUCK.
APPLICATION FILED JUNE 18, 1915.
1,186,724.
Patented June 13, 1916.
2 SHEETS—SHEET 1.
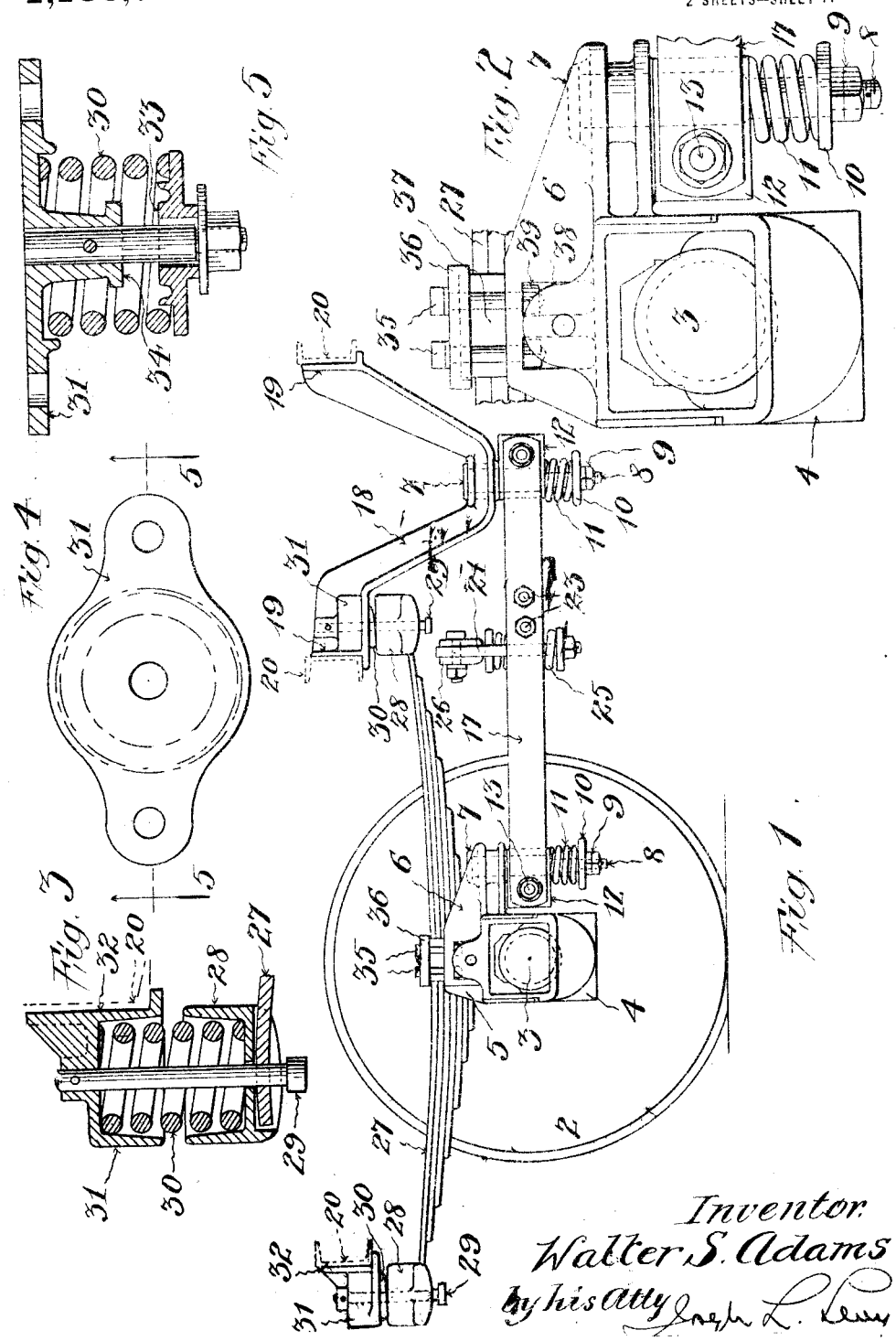
Inventor
Walter S. Adams
by his Atty

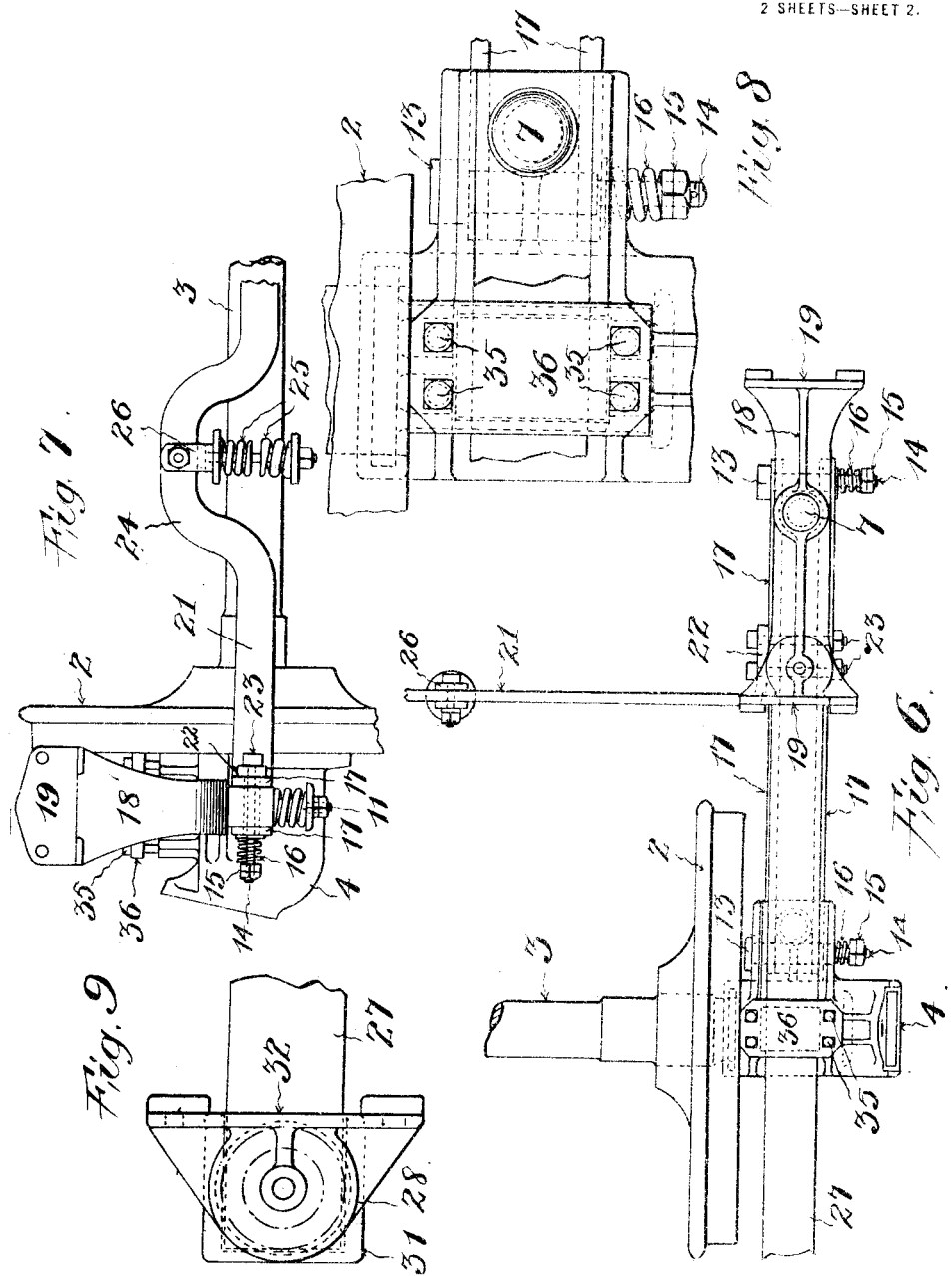

UNITED STATES PATENT OFFICE.

WALTER S. ADAMS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR-TRUCK.

1,186,724.  Specification of Letters Patent.  Patented June 13, 1916.

Application filed June 18, 1915. Serial No. 34,843.

*To all whom it may concern:*

Be it known that I, WALTER S. ADAMS, a citizen of the United States, and a resident of the city and county of Philadelphia, State of Pennsylvania, have invented a new and useful Invention in Car-Trucks, of which the following is a specification.

The object of my invention is to provide a truck which is suitable for cars propelled by electric motors, which truck will be light, strong, durable and easy riding and suitable in every way for light cars, and particularly cars with metallic frames. These, and other objects are accomplished by my invention, one embodiment of which is hereinafter set forth.

For a more particular description of my invention, reference is to be had to the accompanying drawings, forming a part hereof, in which—

Figure 1 is a side elevation of my improved truck, portions of the crossings and the car body being shown in dotted lines; Fig. 2 is an enlarged view of an axle box; Fig. 3 is a sectional view showing one form of spring cups with a coil spring mounted therein and the end of a leaf spring; Figs. 4 and 5 show a modified form of cups together with the connected parts, Fig. 5 being a sectional view, taken on the line 5—5 of Fig. 4, looking in the direction of the arrows; Fig. 6 is a plan view of half of my improved truck; Fig. 7 is an end elevation of the same looking toward the motor support; Fig. 8 is a plan view of the structure shown in Fig. 2; and Fig. 9 is an enlarged view of a spring cap and one end of a semi-elliptic spring, a portion of a spring seat being also shown.

Throughout the various views of the drawings, similar reference characters designate similar parts.

My improved truck 1 is provided with the conventional wheels 2 and axles 3, one axle and two wheels being required for each truck. At each end of the axle 3 is mounted an axle box 4 which may be of any suitable design as to the parts which are connected with the axle, and on its top it is provided with a suitable spring seat 5 to carry an upwardly flared semi-elliptic spring, and adjacent to this seat and extending laterally therefrom is a projection 6 which is perforated in a vertical direction to receive and support a pin 7 which is provided at its lower end with screw threads 8 and lock nuts 9 on which rest a washer 10, which carries a coil spring 11, which bears against the under side of a block 12 which is pressed against the under side of the projection 6 by the action of said spring 11, so that the block 12 can turn on the pin 7 with some frictional resistance due to the spring 11.

The block 12 has two holes, one vertically disposed, through which the pin 7 passes, and a horizontally disposed second one through which a second pin or bolt 13 is passed. The bolt 13 is provided with screw threads 14, lock nuts 15, and coil spring 16 which presses the parallel bars 17 against the block 12 so that these bars are pivotally connected to the block and permitted to shift thereon with a limited movement which is always opposed by the friction caused by the tension of the spring 16. The bars 17 are suitably perforated so as to be carried and connected, as above set forth, the perforations in the bars 17 registering with the horizontal perforations in the block 12. The other ends of the bars 17 are united by a bolt 13 and a block 12 identical with what has been above described, and this second block 12 has a pin 7 extending therethrough, precisely as above described, except that this pin 7 also passes through a bracket 18 instead of the projection 6 on the jam box. The bracket 18 is upwardly splayed and provided with suitable seats 19 which are adapted to be fixed to suitable crossings 20 of the car frame.

The inner bars 17 on each side of the truck are connected by a suitable crossing 21 which has laterally extending ends 22 secured to the bars 17 by bolts 23 and its center is upwardly arched at 24 to carry the motor supporting springs 25 and their supporting bracket 26 so that the motor will be hung true with regard to the axle 3 of the truck. Each axle box 4 also carries in its seat 5 a semi-elliptic spring 27 with its free ends extending upwardly, and each end is provided with a suitable seat 28 for a coil spring, and is perforated to receive a pin 29, which extends upwardly through the spring seat 28, coil spring 30 and cap 31 where it is secured by any suitable device, as a cotter. The cap 30 is provided with a suitable seat 32 which is adapted to engage a crossing 20 of the car body and be secured against the same, or else the cap 31 forms a part of the bracket 18. In either event, the seat 28 and cap 31 come together whenever the load in the car is sufficient to compress the coil spring 30 a predetermined amount which is much less than the capacity of the spring 27, so that when the truck is in use light loads will be cushioned by the springs 30 acting with the springs 27, and heavy loads will be cushioned by the springs 27 acting alone, so that under all conditions of service, without regard to the load, an easy riding truck is obtained.

In Fig. 3 the seat 28 and cup 31 meet on their peripheries outside of the coil spring 29. In Figs. 4 and 5 the structure is slightly modified in that the seat and cap have projections 33 and 34 respectively, which meet inside the coil spring. Each semi-elliptic spring 27 is secured to the axle box 4 and to its seat 5, by means of suitable bolts 35 and a perforated plate 36, through which said bolts pass and which rests on the pin 37 of the spring. Suitable recesses 38 are provided in the walls of the seat 6 to receive the nuts 39 of the bolts 35.

In view of the foregoing, the operation of my improved truck will be readily understood. Under the normal conditions of service, the springs will act as above set forth and carry the car body without undue vibration. When the car strikes a curve the mounting of the axle box permits a slight lateral movement of the axles so that the car can readily accommodate itself to any curve without having the wheels press too hard against the car rail so that undue wear of the flanges is eliminated.

Having thus described my invention, what I claim is:

1. In a truck of the class described, axle boxes, semi-elliptic springs carried from said axle boxes, coil springs carried by said semi-elliptic springs and adapted to support a car body therefrom, projections extending from said axle boxes, brackets extending from the car body, and bars with friction causing means connecting said projections and brackets.

2. In a truck of the class described, axle boxes, semi-elliptic springs secured to said axle boxes, means for supporting a car body from said semi-elliptic springs, brackets extending from said car body, and flexible, friction causing means connecting said brackets and axle boxes.

3. In a truck of the class described, axle boxes, semi-elliptic springs carried from said axle boxes, means on said springs for carrying a car body, projections from said axle boxes, pins extending from said axle boxes and blocks mounted on said pins, parallel bars secured to said blocks, brackets, pins on said brackets, blocks mounted on said last mentioned pins, and means for connecting said parallel bars to said last mentioned blocks.

4. In a truck of the class described, axle boxes, semi-elliptic springs carried from said axle boxes and secured thereto, cups on said semi-elliptic springs, springs on said cups, caps on said springs, means on said caps for securing the same to a car body, projections extending from said axle boxes, parallel bars connected to said projections, and frictional means for connecting said bars and projections, brackets and means for connecting said brackets and parallel bars.

5. In a truck of the class described, axle boxes, semi-elliptic springs mounted on said axle boxes and secured thereto, means for supporting a car body from said semi-elliptic springs, projections extending from said axle boxes, brackets, and means connecting said axle boxes and brackets with a flexible connection and a motor support connecting said means on each side of the truck.

6. In a truck of the class described, axle boxes, semi-elliptic springs carried thereby and means for supporting a car body from said springs, projections extending from said axle boxes, brackets and parallel bars connecting said projections and brackets and a motor support connecting the parallel bars on opposite sides of the truck.

7. In a truck of the class described, axle boxes, and means for supporting a car body therefrom, projections extending laterally from said axle boxes, brackets adapted to be secured to a car body and parallel bars connecting said brackets and projections on each side of the truck, and a motor support connecting the parallel bars on opposite sides of the truck.

8. In a truck of the class described, axle boxes, semi-elliptic springs carried by said axle boxes, seats on the outer ends of said semi-elliptic springs, coil springs on said seats, caps on said springs, said seats and caps adapted to abut and limit the compression of the coil springs, one of the caps being secured to the car body, the other of said caps being secured to a bracket, said bracket being secured to the car body.

9. In a truck of the class described, axle boxes, semi-elliptic springs carried by said axle boxes, seats mounted on the ends of said semi-elliptic springs, coil springs mounted in said seats, caps mounted on said coil springs, said caps and seats adapted to abut and limit the compression of the coil springs, a bracket mounted on the car body, one of the coil spring caps secured to said bracket, the other coil spring secured to the car body, a block pivotally mounted on said bracket, a projection on the axle box, a block pivotally mounted on said projection, parallel bars extending between said blocks and pivotally mounted on said blocks and adjustable means for frictionally resisting the pivotal movements of the blocks and parallel bars.

10. In a truck of the class described, axle boxes, semi-elliptic springs carried by said axle boxes, seats mounted on the ends of said semi-elliptic springs, coil springs resting on said seats, caps for said springs, pins secured to said caps and extending through said caps and seats, projecting portions on said caps and seats adapted to abut and limit the compression of the coil springs, one of the caps secured to the car body, the other of said caps being secured to a bracket which is secured to the car body, projections on the axle boxes, parallel bars extending between said projection and said bracket said parallel bars being mounted to allow vertical and horizontal movement and means for frictionally resisting such movement of the parallel bars.

Signed at the city and county of Philadelphia, and State of Pennsylvania, this 18th day of May, 1915.

WALTER S. ADAMS.